US010285054B2

(12) United States Patent
Jaggi (10) Patent No.: US 10,285,054 B2
(45) Date of Patent: *May 7, 2019

(54) METHOD AND SYSTEM FOR STORING AND ACCESSING CLIENT DEVICE INFORMATION IN A DISTRIBUTED SET OF NODES

(71) Applicant: Hewlett Packard Enterprise Development LP, Houston, TX (US)

(72) Inventor: Mohit Yashpal Jaggi, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 2 days.

This patent is subject to a terminal disclaimer.

(21) Appl. No.: 15/074,890

(22) Filed: Mar. 18, 2016

(65) Prior Publication Data

US 2017/0272433 A1 Sep. 21, 2017

(51) Int. Cl.
| H04W 8/18 | (2009.01) |
| H04W 12/06 | (2009.01) |
| H04W 36/00 | (2009.01) |
| H04W 48/14 | (2009.01) |
| H04W 84/12 | (2009.01) |

(52) U.S. Cl.
CPC ............. *H04W 12/06* (2013.01); *H04W 8/18* (2013.01); *H04W 36/00* (2013.01); *H04W 48/14* (2013.01); *H04W 84/12* (2013.01)

(58) Field of Classification Search
CPC ... H04L 63/0876; H04L 63/062; H04L 63/10; H04W 12/04; H04W 12/06

USPC ....................................................... 713/171
See application file for complete search history.

(56) References Cited

U.S. PATENT DOCUMENTS

| 7,080,135 B1 | 7/2006 | Williams |
| 2002/0138551 A1 | 9/2002 | Erickson |
| 2006/0133320 A1 | 6/2006 | Kim et al. |
| 2008/0225780 A1 | 9/2008 | McCormick et al. |
| 2008/0288654 A1 | 11/2008 | Matuszewski et al. |
| 2011/0064047 A1 | 3/2011 | Nieminen |
| 2011/0227790 A1 | 9/2011 | Li et al. |
| 2013/0091288 A1 | 4/2013 | Shalunov et al. |
| 2013/0176989 A1 | 7/2013 | O'Neill |

OTHER PUBLICATIONS

Ahrenholz, "Host Identity Protocol Distributed Hash Table Interface", Feb. 2012, Internet Research Task Force(IRTF), RFC6537, Retrieved on Apr. 5, 2016, 20 pages.

*Primary Examiner* — Harunur Rashid
*Assistant Examiner* — Angela R Holmes
(74) *Attorney, Agent, or Firm* — Hewlett Packard Enterprise Patent Department (57) ABSTRACT

A method includes identifying a first node in a plurality of nodes based on a client device identifier for a client device, the client device being associated with a first network device; storing, information for the client device, on the first node; responsive to the client device associating with a second network device, retrieving the information for the client device by: identifying the first node based on the client device identifier for the client device and obtaining the information from the first node.

17 Claims, 4 Drawing Sheets

METHOD AND SYSTEM FOR STORING AND ACCESSING CLIENT DEVICE INFORMATION IN A DISTRIBUTED SET OF NODES

RELATED APPLICATIONS

The present application claims priority from co-pending U.S. application Ser. No. 13/563,639, entitled "STORING AND ACCESSING CLIENT DEVICE INFORMATION IN A DISTRIBUTED SET OF NODES," filed on 31 Jul. 2012, by Mohit Yashpal Jaggi, the entire contents of which are incorporated by reference herein.

TECHNICAL FIELD

The present disclosure relates to storing and accessing client device information in a distributed set of nodes. In particular, the present disclosure relates to storing, in a set of a distributed nodes mapped to client device identifiers, client device information that is generated when a client is associated with a first network device and retrieved in response to a client associating with a second network device.

BACKGROUND

In recent years, Wireless Local Area Network (WLAN) technologies have emerged as a fast-growing market. Among the various WLAN technologies, Institute of Electrical and Electronics Engineers (IEEE) 802.11 standard is the dominating technology and is frequently used for WLANs.

Client devices within WLANs communicate with access points to obtain access to one or more network resources. Access points are digital devices that may be communicatively coupled to one or more networks (e.g., Internet, an intranet, etc.). Access points may be directly connected to the one or more networks or connected via a controller. An access point, as referred to herein, may include a wireless access point (WAP) that communicates wirelessly with devices using Wi-Fi, Bluetooth or related standards and that communicates with a wired network.

A client device that is communicatively coupled to a first access point may switch to a second access point due to a change in location of the client device, failure of the first access point, a better signal strength for the second access point, or for any other reason. The second access point then determines whether or not to grant the client device access to one or more network resources via the second access point.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

General Overview

In one or more embodiments, information for client devices is stored in a distributed set of nodes (for example, a distributed hash table) that is keyed based on client device identifiers corresponding to the client devices. In one example, upon authentication of a client device by a RADIUS server, a first network device determines a particular node in a distributed set of nodes, based on a client device identifier, to store state information for the client device. State information (for example, authentication information, firewall session information, multicast information, gateway information, and/or optimization information) for the client device is stored on the particular node. Alternatively, or in addition, identification, of another network device which stores at least a portion of the state information for the client device, is stored on the first node.

In one or more embodiments, nodes of a distributed set of nodes are (a) selected based on client device identifiers and (b) queried for information associated with client devices corresponding to the client device identifiers. In one example, a client device, which was previously associated with a first access point, requests association with a second access point. The second access point (or other network device such as a controller) determines a MAC address of the client device from the association request and applies a hash function to the MAC address to compute a hash value. The second access point identifies a particular node in a distributed hash table that is associated with the hash value and obtains from the particular node (a) authentication information such as a shared key from prior authentication(s) of the client device and (b) an identification such as an IP address of a network device which stores additional information for the client device, Based on the information, the access point communicates with the client device to create at least one encryption key for encrypting communication between the access point and the client device. Furthermore, while the at least one encryption key is being created, the additional information for the client device is obtained from the network device based on the IP address. In this example, the additional information may include multicast information identifying the multicast subscriptions for the client device. The concurrent creation of the encryption keys and obtaining of the multicast information allows the second access point to quickly resume the multicast subscriptions for the client device.

Architectural Overview

Figure 1:
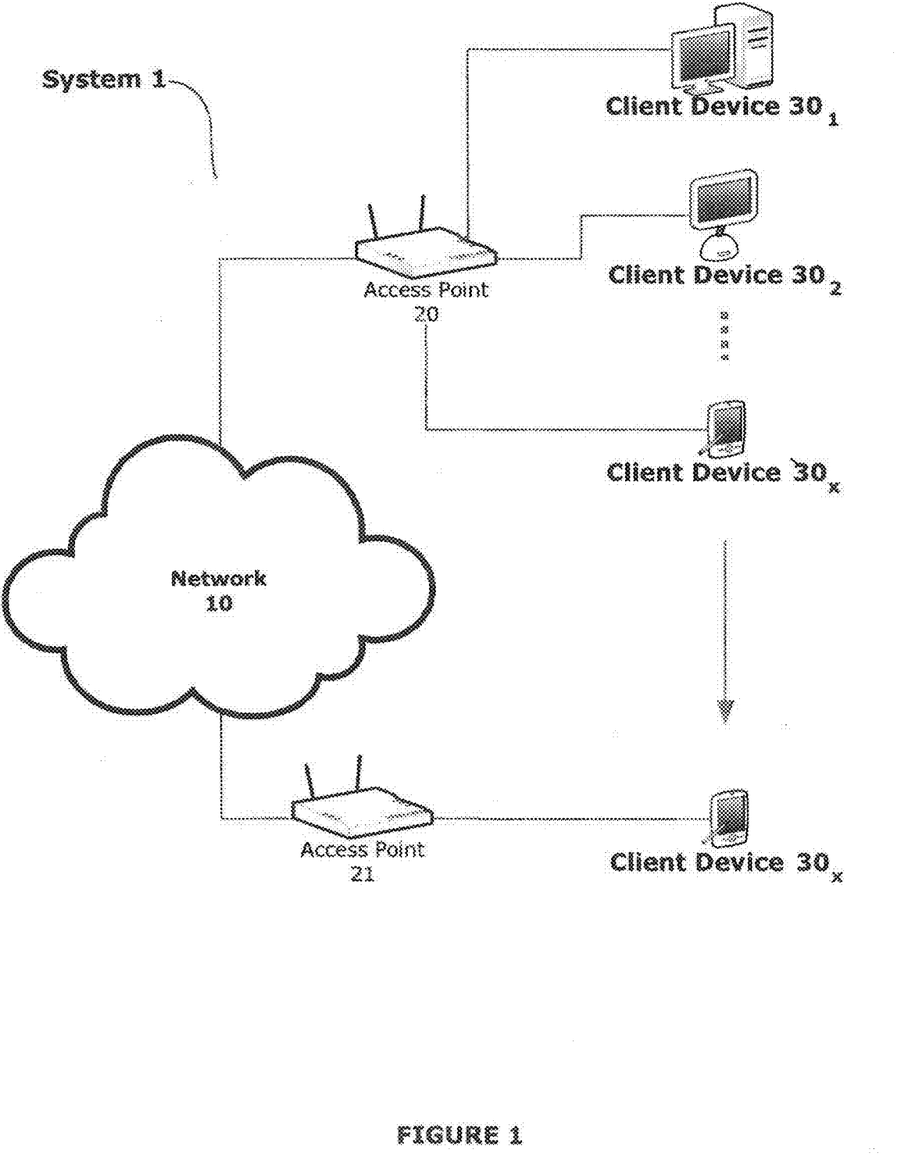
FIG. 1 shows a block diagram example of a system in accordance with one or more embodiments.

FIG. 1 shows a block diagram example of a system which includes digital devices in accordance with one or more embodiments. In one or more embodiments, System 1 may include more or less digital devices, than the devices illustrated in FIG. 1.

The term "digital device" generally refers to any hardware device that includes a processor. When the digital device is adapted for communications with a network, the digital device may be configured as a network device, a client device, or both. A digital device may refer to a physical controller device or a hardware device executing a virtual controller.

A digital device may be a network device and/or a client device. A "network device" is a digital device that may be configured to provide a network service. A "client device" is a digital device that may be configured to receive a network service. Examples of digital devices include a computer, a tablet, a laptop, a desktop, a netbook, a server, a web server, authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a television, a content receiver, a set-top box, a video gaming console, a printer, a mobile handset, a smartphone, a personal digital assistant "PDA", a wireless receiver and/or transmitter, an access point, a base station, a communication management device, a router, a switch, and/or a controller.

System 1, as illustrated in FIG. 1, is a system that includes a network 10 (for example, a Local Area Network, a Wide Area Network, the Internet, Intranet, etc.), an access point 20, an access point 21, and a set of client devices $30_1$-$30_x$. Access point 20 and access point 21 are communicatively coupled to the network 10 via a transmission medium to send and receive data. The data may include, for example, video data. The transmission medium may be a wired or a wireless connection. Access point 20 and access point 21 may be on a same network or different networks. Access point 20 and access point 21 may be on the same Internet Protocol Subnet or different Internet Protocol Subnets. In an example, System 1 may include one or more controllers (not shown) which are configured to communicate with one or more access points (for example, access point 20 and access point 21) within System 1. The controller links one or both access point 20 and access point 21 to network 10. Alternatively, two separate controllers link access point 20 and access point 21 to network 10.

In one or more embodiments, access point 20 and access point 21 each correspond to a network device such as a wired access port, a wireless access port, a switch, a router, or any combination thereof. An access point communicatively couples a client device to one or more other devices and/or resources within System 1. The access point 20 is configured to forward data to or from the client devices $30_1$-$30_n$.

In an embodiment, the client devices $30_1$-$30_n$ are digital devices that include a processor, memory, and input/output (I/O) interfaces including a wireless interface such as an IEEE 802.11 wireless interface. The wireless interface may be used to communicate with the access point 20 to obtain access to devices and/or resources within System 1. The client devices $30_1$-$30_n$ may be wireless electronic devices that are capable of receiving voice data streams, video data streams, or any other type of data. Examples of client devices include personal computers, laptop computers, netbook computers, wireless music players, portable telephone communications devices, smart phones, tablets, and digital televisions.

In an embodiment, a set of digital devices within System 1 (for example, digital devices within Network 10) correspond to nodes within a distributed set of nodes. One example of a distributed set of nodes, used herein, includes a Distributed Hash Table (DHT). A DHT is used in one or more examples for purposes of clarity, however, any other distributed set of nodes may be used in accordance with one or more embodiments. A DHT, as referred to herein, includes a set of nodes such that each node is associated with one or more hash values and stores state information for one or more client devices.

In an example, access point 20 and access point 21 are both nodes within a DHT and store information related to client devices within System 1. In another example, access point 20 is connected to a node (for example, a controller) in the DHT while access point 20 is not itself a node in the DHT (or other distributed set of nodes). In an example, the nodes are designated data repositories that are communicatively coupled to access points within System 1. Various combinations of devices within System 1 may be used as nodes for storing data.

In an embodiment, a hash value associated with a node in the DHT is generated by applying a hash function to a client device identifier of a client device. The client device identifier refers to any information that is associated with a client device and is persistent as the client device connects to different access points (for example, access point 20 and access point 21). An example of a client device identifier is a Media Access Control (MAC) address of a client device. In another example, a client device identifier corresponds to an identification number assigned to each device used in an enterprise network by a system administrator or automatically by a device registration application. In an example, a client device identifier is a group ID that is shared by a set of devices within a corporate department. The group ID may be associated with a particular node, within a distributed set of nodes, that stores information for all client devices that are configured to use the group ID as the client device identifier. In an example, the client device identifier is a group ID for all client devices associated with a particular node in the distributed set of nodes.

In an embodiment, a node stores information about one or more client devices. The information may include an identification of one or more other network devices which store additional information about the one or more client devices. Accordingly, portions of information associated with a client device may be distributed on nodes in the distributed set of nodes, on devices identified by information stored on the nodes in the distributed set of nodes, or any combination thereof. The information associated with a client device includes any of:

a. Authentication Information—Information related to, used in, or generated during prior authentications of the client device.

b. Multicast Information—Information related to multicasts received by the client device.

c. Optimization Information—Information related to the configuration of the client device or configuration of access points in communication with the client device for optimal performance.

d. Encryption Key Information—Information related to encryption keys used for encrypting data received by the client device or data sent by the client device.

e. Firewall Session Information—Information related to a firewall session defining acceptable data sources or data types for the client device.

f. Gateway Information—Dynamic Host Configuration Protocol (DHCP) parameters used for an access point when communicatively coupling the client device to one or more resources on a network.

g. Fast Roaming Information—Keys for Opportunistic Key Caching (OKC) as defined under IEEE 802.11

In an embodiment, information for a client device that typically changes or expires relatively faster than other information for a client device is referred to herein as "rapidly changing state information." The other information which changes or expires relatively slowly is referred to herein as "slowing changing state information." In one example, slowly changing state information is stored at a node in the set of distributed nodes and rapidly changing state information is stored at another location referred to by the node in the set of distributed nodes.

Access Points

Figure 2:
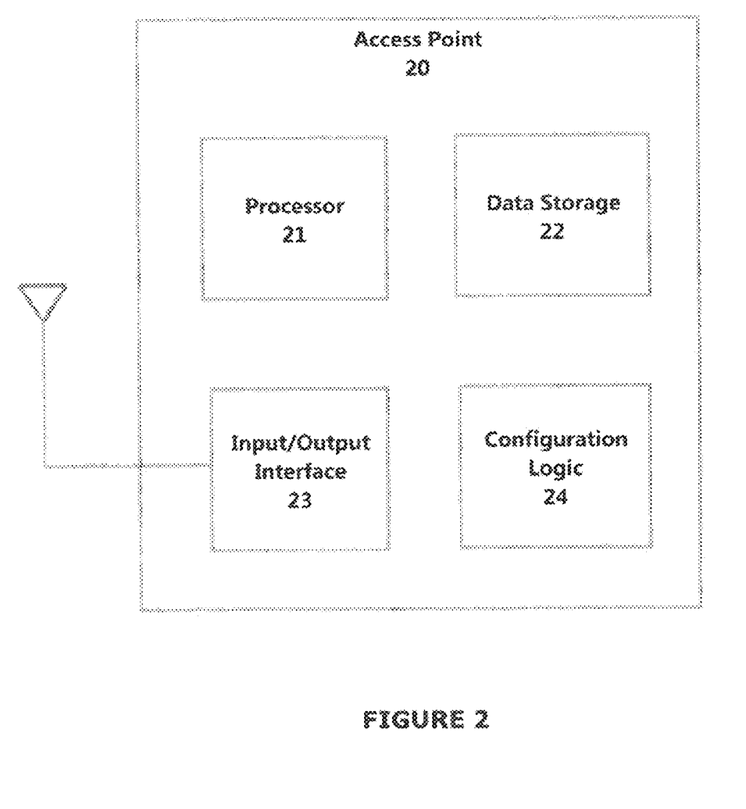
FIG. 2 shows a block diagram example of an access point in accordance with one or more embodiments.

FIG. 2 shows a block diagram example of access point 20 in accordance with one or more embodiments. One or more steps described herein as being performed by an access point, may be performed by another network device such as a controller. Furthermore, one or more components described herein as being implemented within an access point may be implemented within another network device such as a controller. Access points within System 1 may be configured similarly or differently than access point 20. Access point 20 is a network device that comprises one or more of: a processor 21, data storage 22, an I/O interface 23, and a device configuration logic 24.

The data storage 22 of the access point 20 may include a fast read-write memory for storing programs and data during the access point 20's operations and a hierarchy of persistent memory such as ROM, EPROM, and Flash memory for storing instructions and data needed for the startup and/or operations of access point 20. The data storage 22 stores data that is to be transmitted from the access point 20 or data that is received by access point 20. In an embodiment, the data storage 22 is a distributed set of data storage components.

In an embodiment, the I/O interface 23 corresponds to one or more components used for communicating with other devices via wired or wireless segments. The I/O interface 23 may include a wired network interface such as an IEEE 802.3 Ethernet interface and/or a wireless interface such as an IEEE 802.11 WiFi interface.

The processor 21 is coupled to the data storage 22 and the I/O interface 23. The processor 21 may be any processing device including, but not limited to a MIPS-class processor, a microprocessor, a digital signal processor, an application specific integrated circuit, a microcontroller, a state machine, or any type of programmable logic array.

In an embodiment, the device configuration logic 24 includes one or more functional units implemented using firmware, hardware, software, or a combination thereof for configuring parameters associated with the access point 20. Although, the device configuration logic 24 is shown as implemented on access point 20, one or more physical or functional components of the device configuration logic 24 may be implemented on a separate device. The individual functional components of the device configuration logic 24 are described below with Reference to FIG. 3.

Device Configuration Logic

Figure 3:
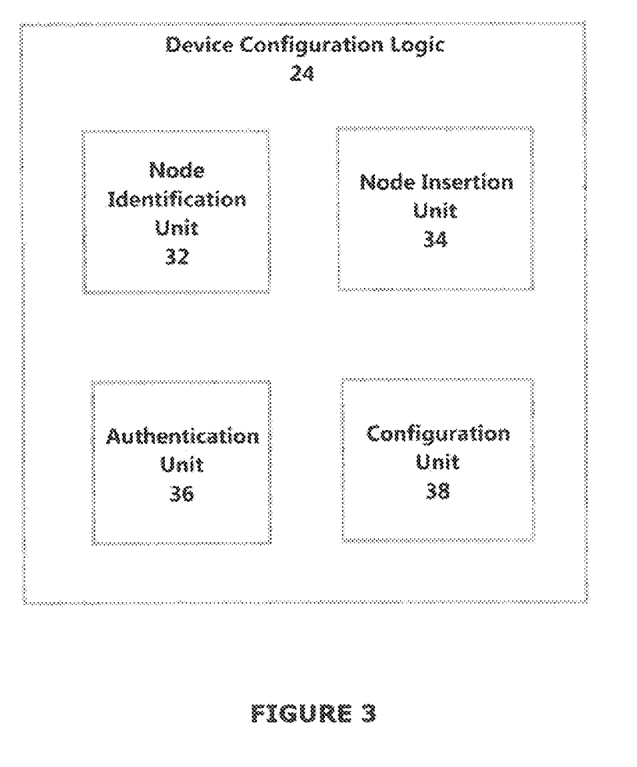
FIG. 3 illustrates an example of a device configuration logic in accordance with one or more embodiments.

FIG. 3 illustrates an example of device configuration logic 24 in accordance with one or more embodiments. The device configuration logic 24 includes functional units implemented using firmware, hardware, software, or a combination thereof. In one or more embodiments, the device configuration logic 24 is implemented with functional units including a node identification unit 32, a node insertion unit 36, an authorization unit 36, and an configuration unit 38. Components and functionalities described with reference to a particular functional unit may instead be implemented within another functional unit. Furthermore, two or more functional units may be combined into a single program or single device. A single functional unit may be implemented as multiple devices or multiple applications that each performs a portion of the functions described herein.

In an embodiment, a node identification unit 32 includes functionality to identify a node in a distributed set of nodes (for example, Distributed Hash Table (DHT)) that corresponds to a client device identifier for a client device. The node identification unit is configured to apply one or more hash functions to at least a portion of a client device identifier to obtain a hash value. The identification unit is further configured to perform a DHT look-up function by querying a node of the DHT with the hash value to identify the node corresponding to the hash value. The identification unit may be configured to query a database based on the client device identifier and receive as a result, an identification of the node.

In an embodiment, a node insertion unit 34 includes functionality to insert a node in a DHT (or other distributed set of nodes) or add information for a client device to a node in the DHT. The node insertion unit 34 is configured to select devices within a network to store client device information and associate the devices with hash values. The node insertion unit 34 is also configured to communicate with nodes within the DHT to submit information associated with client devices in the DHT for storage at the client devices.

In an embodiment, an authentication unit 36 includes functionality to evaluate client device information stored in a distributed set of nodes or stored in a network device identified by a node in a distributed set of nodes for determining whether to authenticate the client device associated with the client device information. The authentication unit 36 is configured to communicate with an authentication server to complete an authentication process for a client device that cannot be authenticated using information stored in a distributed set of nodes or a network device identified by the distributed set of nodes.

In an embodiment, a configuration unit 38 includes functionality to configure one or more parameters for an access point, a controller, or other network device involved in providing a client device access to one or more resources and/or devices on a network. In an example, an configuration unit 38 is configured to obtain information associated with a previous firewall session for a client device and create a new firewall session based on the information.

The operations that may be performed by the device configuration logic 24 (or other functional units within the system) for granting access to a client device are described below with reference to FIG. 4.

Granting Access to a Client Device

Figure 4:
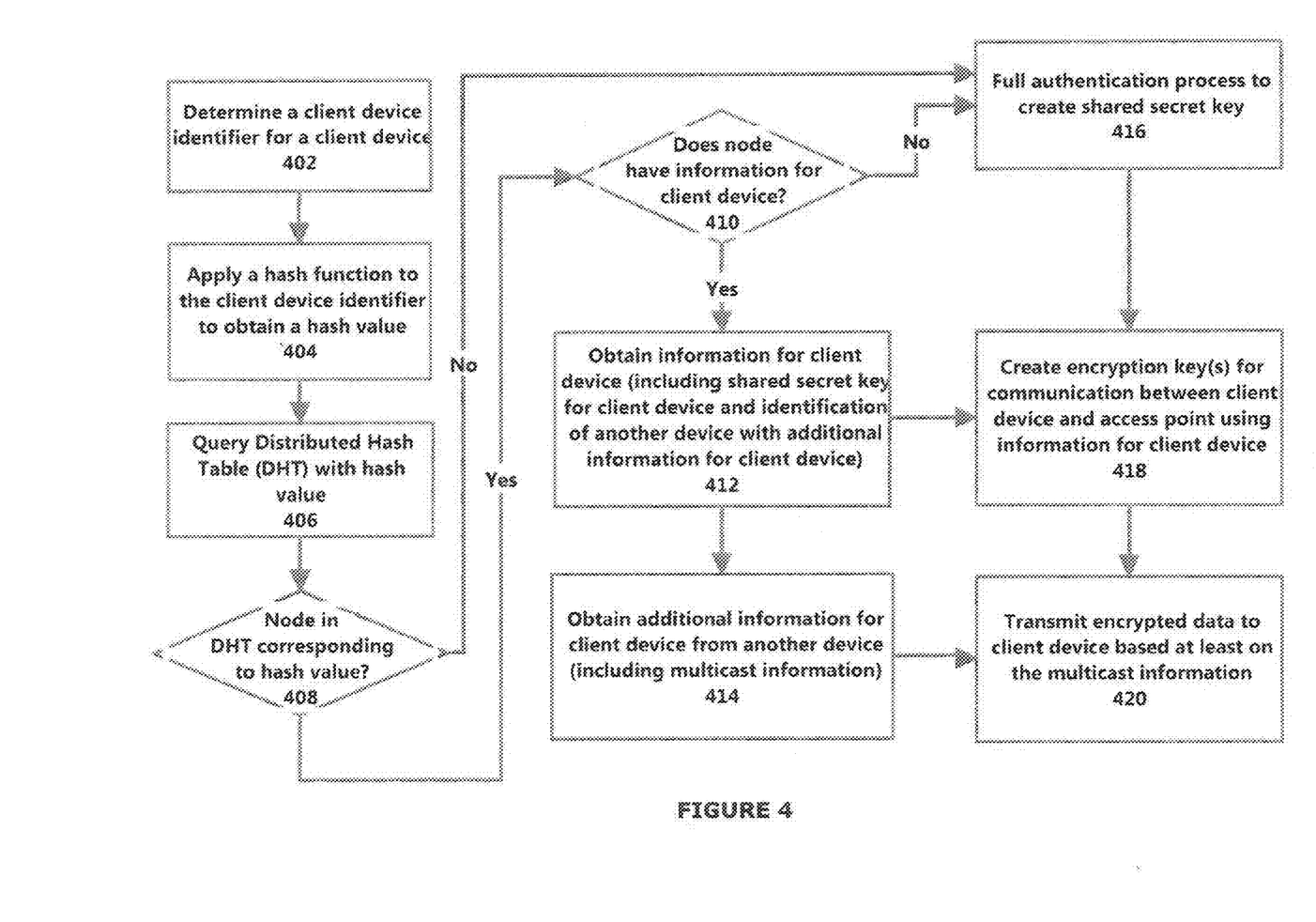
FIG. 4 illustrates an example method for granting a client device access to resources and/or devices on a network.

FIG. 4 illustrates an example method for granting access to a client device. One or more operations illustrated in FIG. 4 may be modified, rearranged, or omitted all together. Accordingly, the particular sequence of operations illustrated in FIG. 4 should not be construed as limiting the scope of one or more embodiments.

Initially, a client device identifier for a client device is determined (Block 402). In an example, a client device transmits a request to associate with an access point in order to obtain access to resources and/or other devices on a network. This initial request by the client device includes a client device identifier (for example, a Media Access Control (MAC) address or administrator-assigned identifier) for the client device. In another example, a network device (for example, an access point or controller) requests a client device identifier from the client device in response to a request for association transmitted by the client device. The client device transmits the client device identifier to the network device.

In one or more embodiments, a hash function is applied to the client device identifier to obtain a corresponding hash value (Block 404). Applying a hash function to the client device identifier includes using at least a portion of the client device identifier as input for an algorithm to obtain the hash value as an output of the algorithm.

The hash value is used to query a Distributed Hash Table for nodes associated with the hash value (Block 406). In one example, the access point initiates a query at a physical controller or a virtual controller that is a node in the DHT. In one or more embodiments, all of the nodes within the DHT are known by each node in the DHT which reduces the time for identifying one or more nodes corresponding to the hash value.

In an embodiment, operations recited in blocks 404 and 406 may be skipped. One or more nodes are directly mapped to the client device identifier (for example, in a table). A query is executed using the client device identifier to identify a node associated with the client device identifier. Any other data structure or algorithm may be used to identify nodes, that store client information, based on the client device identifier. Accordingly, the example use of a DHT as described herein should not be construed as limiting the scope. In an embodiment, the nodes, that store client information, each correspond to a different storage device and together form a distributed set of nodes.

If one or more nodes in the DHT (or other structure) correspond to the hash value (Block 408), the one or more corresponding nodes are queried for information for the client device (Block 410). In one example, a node is queried using the client device identifier to identify information associated with the client device. If information for the client device is found on a node, the information is obtained from the node (Block 412). As described above, the information obtained from the node may include any information associated with the client device including authentication information, multicast information, optimization information, encryption key information, firewall session information, and gateway information.

In one example, the information obtained from the node includes:
   a. A shared secret key (such as a Pairwise Master Key) for the client device
   b. An identification such as an IP address of a network device which stores additional information for the client device.

In this example, since the shared secret key is obtained from the node, a shared secret key does not have to be created using a full authentication process. If the shared secret key is not obtained, a full authentication process is used to create a shared secret key (Block 416).

In an one or more embodiments, one or more encryption keys for encrypting communication with the client device are created (Block 418). The one or more encryption keys may be created with a four-way handshake involving the exchange of AP nonce (ANonce), Station Nonce (SNonce), and Message Authentication Code (MIC) attributes. In an example, a Pairwise Master Key (shared secret key) is used to create a Pairwise Transient Key (encryption key).

In an embodiment, the identification of the network device is used to request and obtain additional information for the client device from the network device (Block 414). In an example, the additional information includes multicast information identifying active multicast subscriptions for the client device.

In an embodiment, the operations described in Block 414 and Block 418 are concurrently performed. Concurrently creating the one or more encryption keys and obtaining the multicast information allows the second access point to quickly resume the multicast subscriptions for the client device. Specifically, the concurrent execution allows for a quick resumption of multicast subscriptions via a new AP when a client device switches to the new AP from a previous AR Furthermore, the concurrent execution of the operations referred to in Block 414 and Block 418 advantageously save time over another embodiment which includes first creating the one or more encryption keys and thereafter, obtaining the multicast information from the client device.

In an embodiment, information (including the additional information) for the client device (referred to in Block 412 and Block 414) may be used to authenticate the client device, configure access, apply permissions, setup firewall sessions, initiate multicast streaming to the client device, or perform any other function associated with granting the client device access to resources and/or devices on the network. Granting access to one or more resources may include communicatively coupling one or more resources with the client device. In the above example, granting access to one or more resources includes transmitting encrypted data to a client device based at least on the multicast information received from a network device (Block 420).

In an embodiment, any information associated with a client device may be stored periodically, in response to an event (for example, change in information) or at another suitable time in a node, of a distributed set of nodes, corresponding to the client device. For example, a client device which has been granted access to resources and/or devices on the network may gain additional permissions or lose previously granted permissions. An access point that is currently granting access to the client device may update a node corresponding to the client device to indicate the current permissions for the client device.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A method comprising:
   storing, information for a client device including at least (1) a client device identifier identifying the client device and (2) authentication information associated with the client device from a prior authentication, on a first controller of a plurality of controllers, wherein the client device is associated with a first access point comprising a first hardware processor;

receiving, by a second access point, a request to associate with the second access point from the client device; the second access point comprising a second hardware processor;

responsive to receiving the request to associate with the second access point from the client device, retrieving, by the second access point that the client device is not associated with, the information for the client device from the first controller stored by the first access point that the client device is associated with; and communicating concurrently, by the second access point, with the client device to create at least one encryption key for encrypting communications between the second access point and the client device based on the retrieved information;

creating, using at least the shared key, one or more encryption keys for encrypting communication between the first access point and the client device;

concurrently with creating the one or more encryption keys, obtaining the multicast information, for the client device, from the second access point.

2. The method of claim 1, wherein the information comprises one or more of:
an identification of a particular device storing multicast information for the client device; or
a shared key associated with the client device.

3. The method of claim 1, wherein identifying the first controller comprises:
applying a hash function to the client device identifier to obtain a hash value;
identifying the first controller responsive to determining that the first controller corresponds to the hash value.

4. The method of claim 1, wherein the information comprises an identification of a particular device storing additional information for the client device, the additional information comprising one or more of:
firewall session information;
multicast proxy information;
Dynamic Host Configuration Protocol (DHCP) parameters used by an access point that was previously configured to grant access to the client device; or
prior authentication information;
wide area network optimization information.

5. A non-transitory computer readable storage medium comprising instructions which, when executed by at least one processor of a first access point, cause the first access point to:
receive a request to associate with the first access point from the client device, the first access point comprising a hardware processor;
responsive to receiving the request to associate with the first access point from the client device, retrieve, by the first access point that the client device is not associated with, information for the client device, wherein the information for the client device is stored by a second access point that the client device is associated with on a first controller of a plurality of controllers, and wherein the information for the client device includes at least (1) a client device identifier identifying the client device and (2) authentication information associated with the client device from a prior authentication; and
communicating concurrently with the client device to create at least one encryption key for encrypting communications between the second access point and the client device based on the retrieved information;

create, using at least the shared key, one or more encryption keys for encrypting communication between the first access point and the client device; and
obtain the multicast information, for the client device, from the second access point concurrently with creating the one or more encryption keys.

6. The non-transitory computer readable storage medium of claim 5, wherein the information comprises one or more of:
an identification of a particular device storing multicast information for the client device; or
a shared key associated with the client device.

7. The non-transitory computer readable storage medium of claim 5, wherein identifying the first controller comprises:
applying a hash function to the client device identifier to obtain a hash value;
identifying the first controller responsive to determining that the first controller corresponds to the hash value.

8. The non-transitory computer readable storage medium of claim 5, wherein the information comprises an identification of a particular device storing additional information for the client device, the additional information comprising one or more of:
firewall session information;
multi cast proxy information;
Dynamic Host Configuration Protocol (DHCP) parameters used by an access point that was previously configured to grant access to the client device; or
prior authentication information;
wide area network optimization information.

9. A system comprising:
a first access point comprising a first hardware processor, and a second access point comprising a second hardware processor, the first access point and the second access point to:
identify a first controller of a plurality of controllers based on a client device identifier for a client device, the client device being associated with the first access point;
store by the first access point, information for the client device including at least (1) a client device identifier identifying the client device and (2) authentication information associated with the client device from a prior authentication, on the first controller of a plurality of controllers;
responsive to receiving a request to associate with the second access point from the client device, retrieve the information for the client device from the first controller stored by the first access point that the client is associated with; and
communicate concurrently, by the second access point, with the client device to create at least one encryption key for encrypting communications between the second access point and the client device based on the retrieved information;
create, using at least the shared key, one or more encryption keys for encrypting communication between the first access point and the client device;
concurrently with creating the one or more encryption keys, obtain the multicast information, for the client device, from the second access point.

10. The system of claim 9, wherein the information comprises one or more of:
an identification of a particular device storing multicast information for the client device; or
a shared key associated with the client device.

11. The system claim 9, wherein identifying the first controller comprises:
  applying a hash function to the client device identifier to obtain a hash value;
  identifying the first controller responsive to determining that the first controller corresponds to the hash value.

12. The system of claim 9, wherein the information comprises an identification of a particular device storing additional information for the client device, the additional information comprising one or more of:
  firewall session information;
  multicast proxy information;
  Dynamic Host Configuration Protocol (DHCP) parameters used by an access point that was previously configured to grant access to the client device; or
  prior authentication information;
  wide area network optimization information.

13. The method of claim 1, wherein retrieving the information for the client device from the first controller stored by the first access point comprises:
  identifying the first controller based on a client device identifier for the client device by the first access point,
  requesting the information for the client device from the first controller, and
  receiving the information for the client device from the first controller.

14. The method of claim 1, wherein the first access point is separate and different from the second access point and the first controller.

15. The non-transitory computer readable storage medium of claim 5, wherein the instructions further cause the first access point to:
  identify the first controller based on a client device identifier for the client device by the first access point,
  request the information for the client device from the first controller, and
  receive the information for the client device from the first controller.

16. The non-transitory computer readable storage medium of claim 5, wherein the first access point is separate and different from the second access point and the first controller.

17. The system of claim 9, wherein the second access point further to:
  identify the first controller based on a client device identifier for the client device by the first access point,
  request the information for the client device from the first controller, and
  receive the information for the client device from the first controller,
  wherein the first access point is separate and different from the second access point and the first controller.

* * * * *